(12) United States Patent
Hosbach et al.

(10) Patent No.: US 9,505,322 B2
(45) Date of Patent: Nov. 29, 2016

(54) MANUAL LUMBAR PUMP ASSEMBLY

(71) Applicant: Ford Global Technologies, LLC, Dearborn, MI (US)

(72) Inventors: Christian J. Hosbach, Allen Park, MI (US); Adam Sachs, Oak Park, MI (US); Marc Kondrad, Macomb Township, MI (US); Johnathan Andrew Line, Northville, MI (US); Jason Nisbett, Wyandotte, MI (US); Mandeep Singh Sidhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 14/063,647

(22) Filed: Oct. 25, 2013

(65) Prior Publication Data

US 2015/0115678 A1      Apr. 30, 2015

(51) Int. Cl.
| | |
|---|---|
| *B60N 2/44* | (2006.01) |
| *A47C 7/46* | (2006.01) |
| *B60N 2/02* | (2006.01) |
| *B60N 2/66* | (2006.01) |

(52) U.S. Cl.
CPC ............ *B60N 2/4415* (2013.01); *A47C 7/467* (2013.01); *B60N 2/02* (2013.01); *B60N 2/66* (2013.01); *B60N 2/665* (2015.04)

(58) Field of Classification Search
USPC ....................................................... 297/284.6
See application file for complete search history.

(56) References Cited

U.S. PATENT DOCUMENTS

| | | | | |
|---|---|---|---|---|
| 2,938,570 | A * | 5/1960 | Flajole | .......................... 297/339 |
| 2,958,369 | A | 11/1960 | Pitts et al. | |
| 3,403,938 | A | 10/1968 | Cramer et al. | |
| 3,481,327 | A * | 12/1969 | Drennen | ......................... 601/44 |
| 3,520,327 | A * | 7/1970 | Abbott et al. | ............. 137/556.6 |
| 3,929,374 | A | 12/1975 | Hogan et al. | |
| 4,190,286 | A * | 2/1980 | Bentley | ....................... 297/284.3 |
| 4,225,989 | A * | 10/1980 | Corbett et al. | .................... 5/713 |
| 4,306,322 | A * | 12/1981 | Young et al. | ..................... 5/710 |
| 4,324,431 | A | 4/1982 | Murphy et al. | |
| 4,334,709 | A | 6/1982 | Akiyama et al. | |
| 4,353,595 | A | 10/1982 | Kaneko et al. | |

(Continued)

FOREIGN PATENT DOCUMENTS

| | | | | |
|---|---|---|---|---|
| DE | 3115269 | A1 * | 10/1982 | ............... A47C 7/46 |
| DE | 4403071 | | 8/1994 | |

(Continued)

OTHER PUBLICATIONS

Rostra Precision Controls Inc. "Universal Lumbar Installation Instructions". 8 pages. http://www.rostra.com/manuals/form3132F.pdf. Nov. 2, 2007.

(Continued)

*Primary Examiner* — David E Allred
(74) *Attorney, Agent, or Firm* — Vichit Chea; Price Heneveld LLP

(57) ABSTRACT

A pump assembly for a vehicle seatback includes a plurality of air bladders defining a lumbar support. A valve body has an inlet and a plurality of outlets that are coupled with the associated plurality of air bladders. A selection device is operably coupled with the valve body for engaging a select one of the plurality of air bladders with the inlet. A manually compressible air chamber is coupled with the inlet for inflating the select one.

18 Claims, 14 Drawing Sheets

(56) References Cited

U.S. PATENT DOCUMENTS

| | | | |
|---|---|---|---|
| 4,444,430 A | 4/1984 | Yoshida et al. | |
| 4,467,484 A * | 8/1984 | Nagatake et al. | 428/58 |
| 4,491,364 A * | 1/1985 | Hattori et al. | 297/284.6 |
| 4,541,669 A | 9/1985 | Goldner | |
| 4,583,255 A * | 4/1986 | Mogaki et al. | 5/632 |
| 4,616,676 A * | 10/1986 | Adams et al. | 297/284.1 |
| 4,629,248 A | 12/1986 | Mawbey | |
| 4,720,141 A | 1/1988 | Sakamoto et al. | |
| 4,781,413 A * | 11/1988 | Shumack, Jr. | 297/252 |
| 4,792,186 A | 12/1988 | Benjamin et al. | |
| 4,893,367 A * | 1/1990 | Heimreid et al. | 5/632 |
| 4,915,447 A | 4/1990 | Shovar | |
| 4,966,410 A | 10/1990 | Bishai | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,785,669 A * | 7/1998 | Proctor et al. | 601/148 |
| 5,826,938 A | 10/1998 | Yanase et al. | |
| 5,836,648 A | 11/1998 | Karschin et al. | |
| 5,902,014 A | 5/1999 | Dinkel et al. | |
| 5,906,586 A * | 5/1999 | Graham | 602/32 |
| 5,913,568 A | 6/1999 | Brightbill et al. | |
| 5,951,039 A | 9/1999 | Severinski et al. | |
| 5,967,608 A | 10/1999 | Van Sickle | |
| 5,983,940 A * | 11/1999 | Smith | 137/625.22 |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,273,810 B1 | 8/2001 | Rhodes, Jr. et al. | |
| 6,296,308 B1 | 10/2001 | Cosentino et al. | |
| 6,312,050 B1 | 11/2001 | Eklind | |
| 6,357,066 B1 * | 3/2002 | Pierce | 5/710 |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,779,560 B1 * | 8/2004 | Reis | 137/864 |
| 6,808,230 B2 | 10/2004 | Buss et al. | |
| 6,820,640 B2 * | 11/2004 | Hand et al. | 137/487.5 |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,059,678 B1 * | 6/2006 | Taylor | 297/284.6 |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,517,024 B2 * | 4/2009 | Cvek | 297/452.13 |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| D655,393 S * | 3/2012 | Whitaker | D23/233 |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |

(56) References Cited

U.S. PATENT DOCUMENTS

| | | |
|---|---|---|
| 2010/0231013 A1 | 9/2010 | Schlenker |
| 2010/0270840 A1 | 10/2010 | Tanaka et al. |
| 2010/0301650 A1 | 12/2010 | Hong |
| 2010/0319796 A1* | 12/2010 | Whitaker ............... 137/625.46 |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2014/0058305 A1* | 2/2014 | Batterson et al. ............... 602/13 |
| 2015/0157481 A1* | 6/2015 | Whitaker et al. |
| 2015/0157482 A1* | 6/2015 | Batterson et al. |

FOREIGN PATENT DOCUMENTS

| | | |
|---|---|---|
| EP | 0754590 | 1/1997 |
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/41691 (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

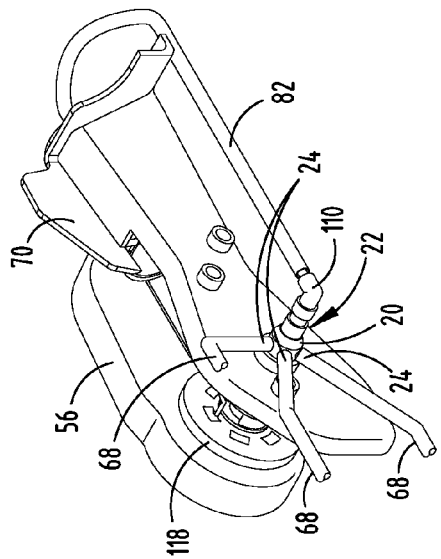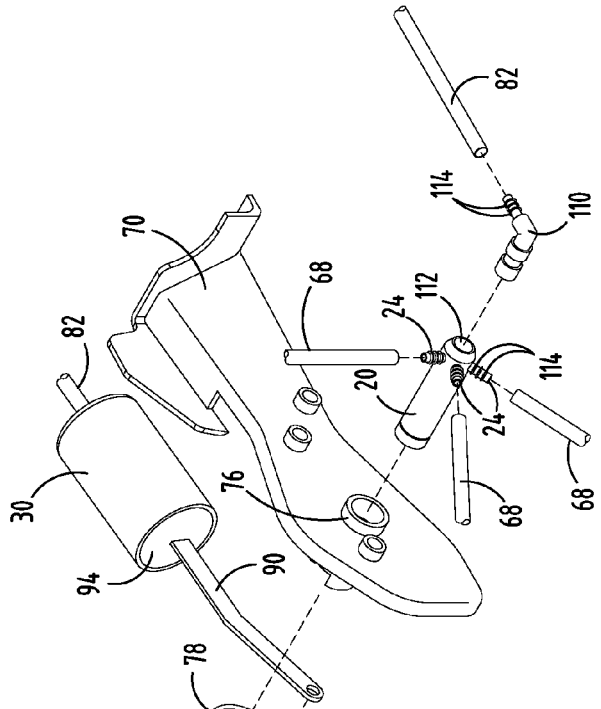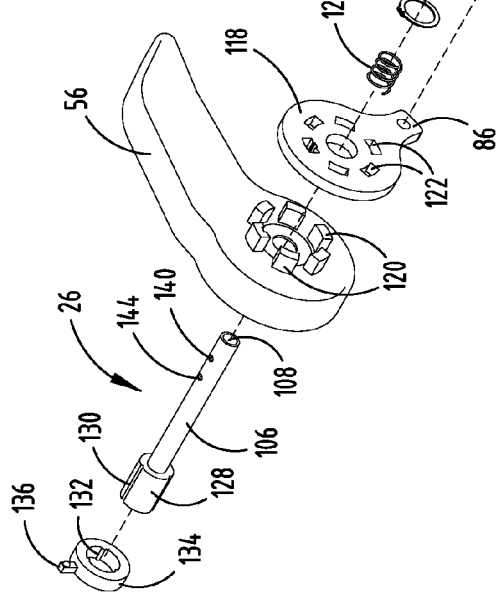

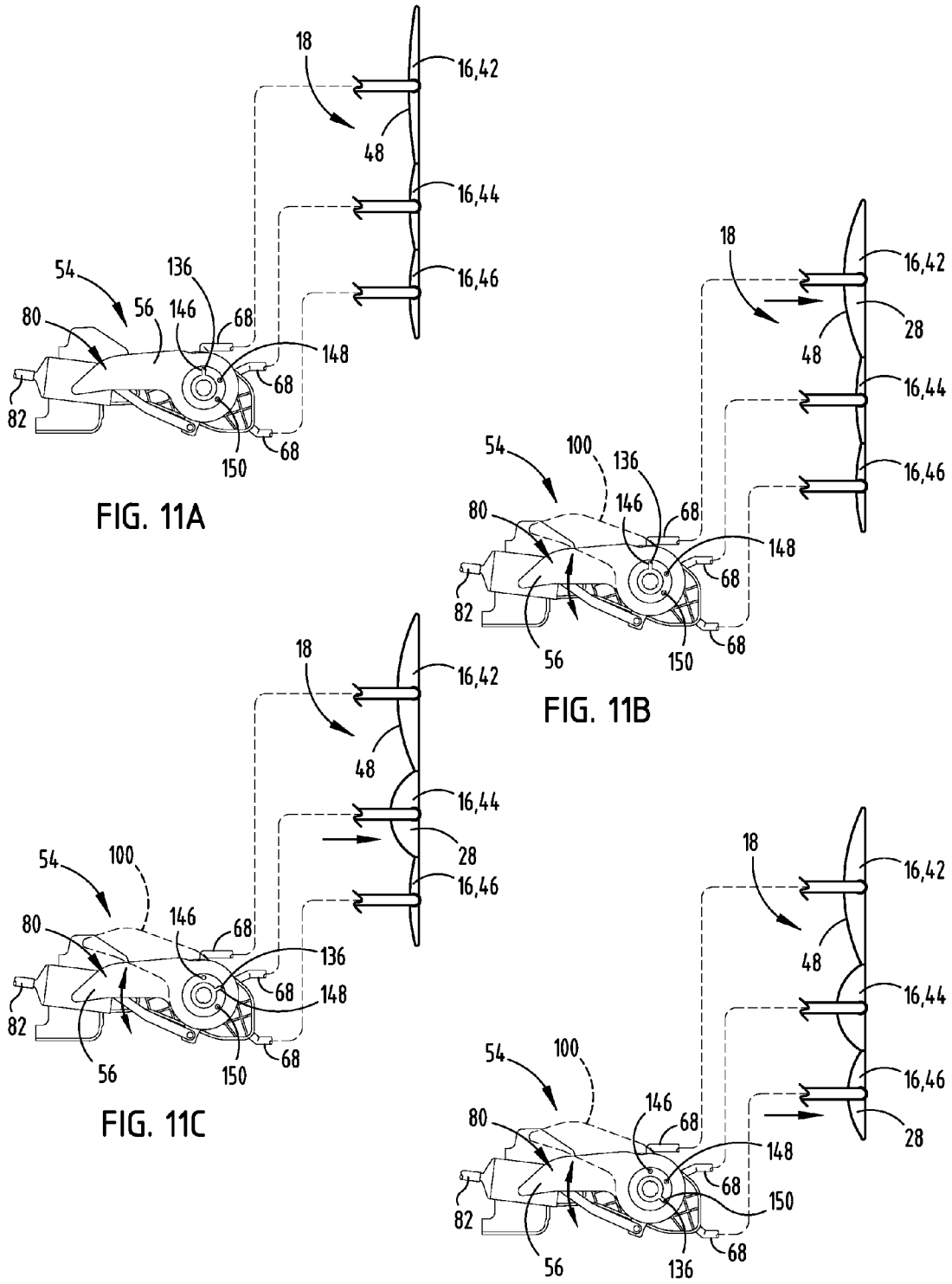

MANUAL LUMBAR PUMP ASSEMBLY

FIELD OF THE INVENTION

The present invention generally relates to a lumbar pump assembly, and more particularly relates to a manual pump assembly for a vehicle seatback.

BACKGROUND OF THE INVENTION

Lumbar support systems are commonly used in a variety of seating constructions. Lumbar support provides comfort and enhanced ergonomic conditions to the lower back of an occupant, thereby creating an enjoyable interaction with the seating arrangement in which the lumbar support is incorporated. In the automobile industry, lumbar support systems assist an occupant during both long and short trips and assist in reducing back pain that can sometimes be affiliated with lack of support to the lower back of an occupant.

SUMMARY OF THE INVENTION

According to one aspect of the present invention, a pump assembly for a vehicle seatback includes a plurality of air bladders defining a lumbar support. A valve body has an inlet and a plurality of outlets that are coupled with the associated plurality of air bladders. A selection device is operably coupled with the valve body for engaging a select one of the plurality of air bladders with the inlet. A manually compressible air chamber is coupled with the inlet for inflating the select one.

According to another aspect of the present invention, a lumbar pump assembly includes first and second air bladders defining a lumbar support. A valve body is fluidly coupled with the first and second air bladders. An air chamber has an exhaust port that is fluidly coupled with the valve body and is configured to manually dispense air therefrom. A selection device is moveable between first and second positions that engage the exhaust port with the respective first and second air bladders.

According to yet another aspect of the present invention, a lumbar pump assembly includes a seatback having a plurality of air bladders disposed thereon to define a lumbar support. An air chamber has an intake port for receiving ambient air and an exhaust port for dispensing air upon compression of the air chamber. A lever is coupled with the air chamber for manually compressing the air chamber. A valve body has an inlet fluidly coupled with the exhaust port and a plurality of outlets coupled respectively with the plurality of air bladders. A selection device is operably coupled with the valve body for selectively engaging a select one of the plurality of outlets with the inlet for inflating the respective air bladder.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a rear top perspective view of the air pump apparatus showing a valve body on an interior side thereof;

FIG. 8 is an exploded rear top perspective view of the air pump apparatus;

FIG. 11A is a side elevational view of the air pump assembly, schematically showing the valve body fluidly coupled with the plurality of air bladders;

FIG. 11B is a side elevational view of the lumbar pump assembly, schematically showing movement of the lever to inflate a first air bladder;

FIG. 11C is a side elevational view of the lumbar pump assembly, schematically showing movement of the lever to inflate a second air bladder;

FIG. 11D is a side elevational view of the lumbar pump assembly, schematically showing movement of the lever to inflate a third air bladder;

DETAILED DESCRIPTION OF THE PREFERRED EMBODIMENTS

Figure 1:
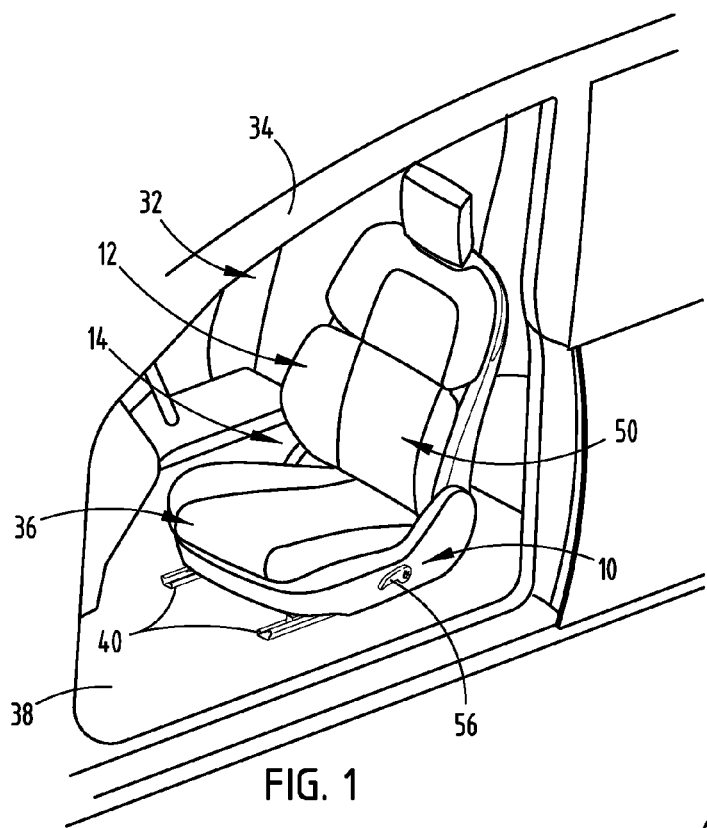
FIG. 1 is a top perspective view of a vehicle seating assembly within a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIGS. 1-19D, reference numeral 10 generally designates a pump assembly for a seatback 12 of a vehicle seating assembly 14. A plurality of air bladders 16 is disposed on the seatback 12 to define a lumbar support 18. A valve body 20 has an inlet 22 and plurality of outlets 24 that are coupled with the plurality of the air bladders 16. A selection device 26 is operably coupled with the valve body 20 for engaging the inlet 22 with a select one 28 of the plurality of air bladders 16. A manually compressible air chamber 30 is coupled with the inlet 22 for inflating the select one 28 of the plurality of air bladders 16.

Referring now to FIG. 1, the vehicle seating assembly 14 is arranged in an interior compartment 32 of a vehicle 34. A seat base 36 of the vehicle seating assembly 14 is slidably coupled with a floor 38 of the vehicle 34 about a track assembly 40. The seatback 12 is pivotally coupled with the seat base 36 to provide a reclining function to the vehicle seating assembly 14, allowing the seatback 12 to pivot relative to the seat base 36. The vehicle seating assembly 14, in the illustrated embodiment, is positioned in a front row on a driver's side of the vehicle 34; however, it is contemplated that the vehicle seating assembly 14 may be positioned on the passenger side of the vehicle 34, a mid-row location, a rear-row location, and other conceivable locations within a vehicle. It is also understood that the vehicle seating assembly 14 may be incorporated with various types of vehicles, including automobiles, vessels, or aircraft.

Figure 2:
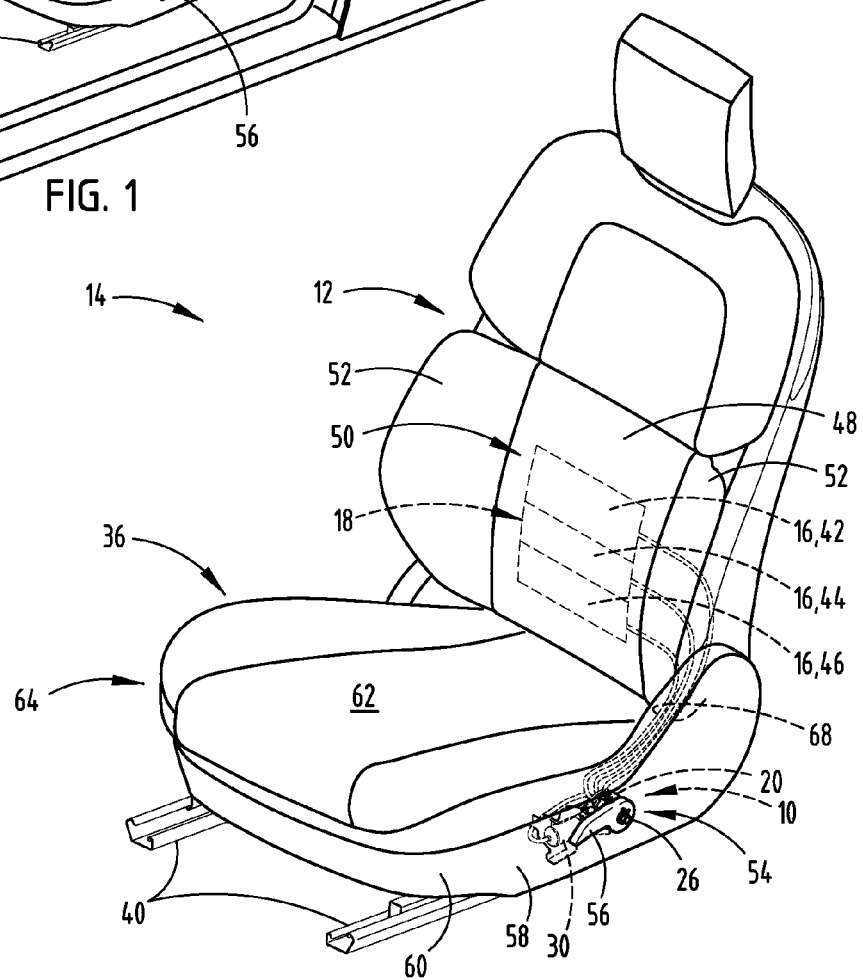
FIG. 2 is a top perspective view of the vehicle seating assembly having a lumbar pump assembly, according to one embodiment of the present invention.

As illustrated in FIG. 2, the plurality of air bladders 16 includes a first air bladder 42, a second air bladder 44, and a third air bladder 46 that are each disposed laterally across a back support surface 48 of the seatback 12. The air bladders 16 are arranged at a central lower back region 50 of the seatback 12 and are spaced adjacent to one another in a series of rows. It is contemplated that the plurality of air bladders 16 may include more or fewer air bladders from those shown in the illustrated embodiment. In addition, it is conceivable that the plurality of air bladders 16 may be arranged on other portions of the seatback 12, such as, side bolsters 52, or on portions of the seat base 36, and the plurality of air bladders 16 may be arranged in alternative shapes and patterns from those shown in the illustrated embodiment.

As also shown in FIG. 2, the plurality of air bladders 16 each couple with an air pump apparatus 54 of the lumbar pump assembly 10 for individually inflating or deflating the selected one 28 (FIG. 3) of the air bladders 16. The air pump apparatus 54 includes a lever 56 that is operably coupled with the compressible air chamber 30 and is located outside an outboard side surface 58 of the seat base 36. More specifically, the seat base 36 includes a trim enclosure 60 that extends along the outboard side of the seat base 36 and at least around the front portion of the seat base 36 to conceal the bottom portion of the seat base 36 beneath a seat cushion 62. Accordingly, portions of the air pump apparatus 54, including the air chamber 30 and the valve body 20, are concealed by the trim enclosure 60, while still allowing the lever 56 and the selection device 26 to be manually operated by an occupant seated in the vehicle seating assembly 14. However, it is understood that the valve body 20, selection device 26, and air chamber 30 may be arranged on an inboard side 64 of the seat bottom, a portion of the seatback 12, or on another interior component of the vehicle 34, such as a center console or an interior surface of a structural member of the vehicle 34.

Figure 3:
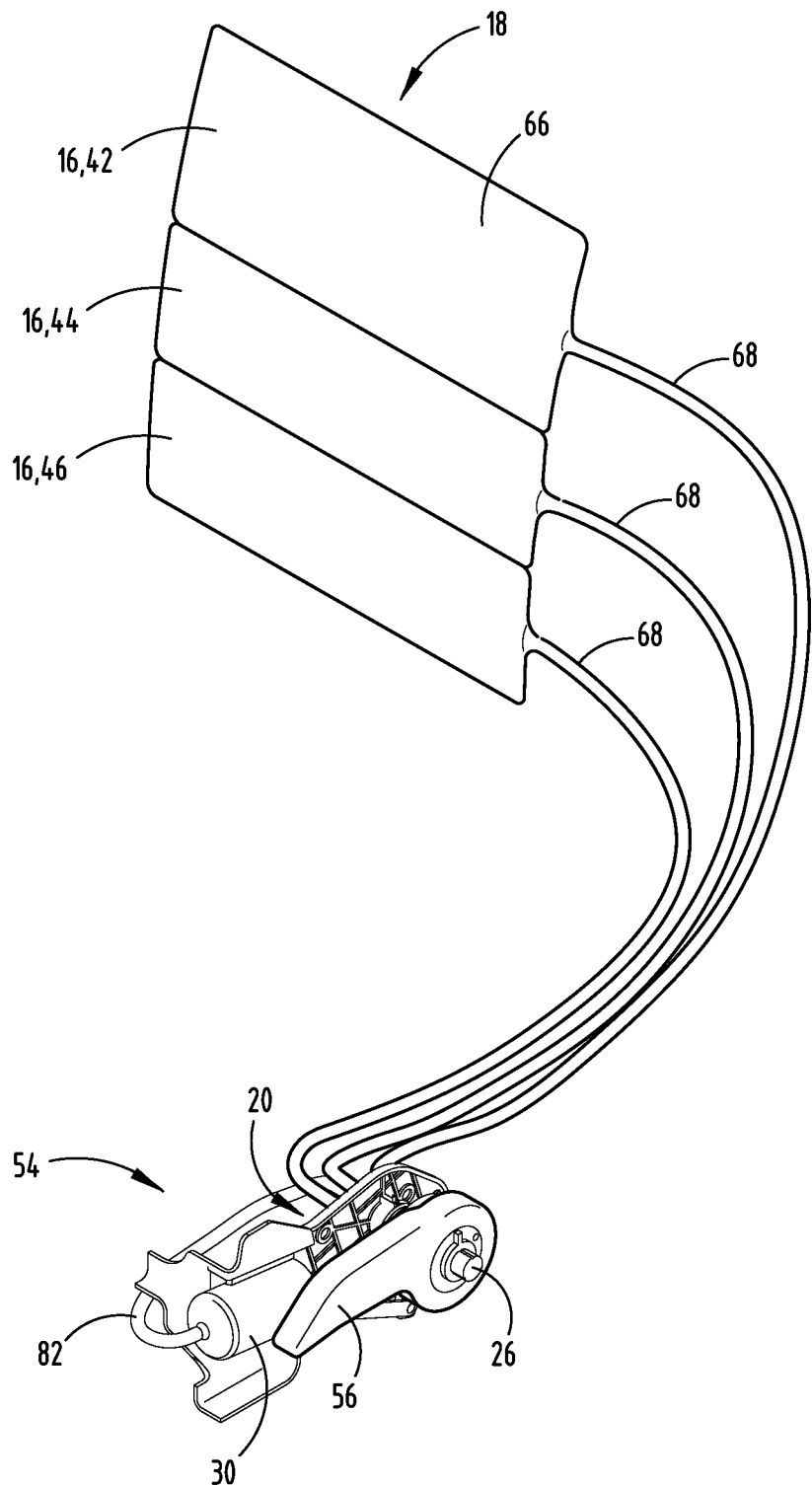
FIG. 3 is a top perspective view of the lumbar pump assembly, having a plurality of air bladders and an air pump apparatus as shown in the embodiment illustrated in FIG. 2.

With reference to the embodiment of the pump assembly 10 illustrated in FIG. 3, the air bladders 16 each include an elongated air sealed compartment 66 made of a pliable material, such as a polymer encasement. Each of the air bladders 16 also has a flexible air line 68 that extends from an outboard end of the respective air bladder to fluidly couple with the valve body 20 of the air pump apparatus 54. The air lines 68 may be integrally formed with the air bladders 16, as illustrated, or may be separately attached thereto. It is also understood that the air bladders 16 may be configured to have the air lines 68 extend from an inboard end and/or other portion of each air bladder for fluidly coupling the interior volume of each air bladder with the valve body 20.

Figure 4:
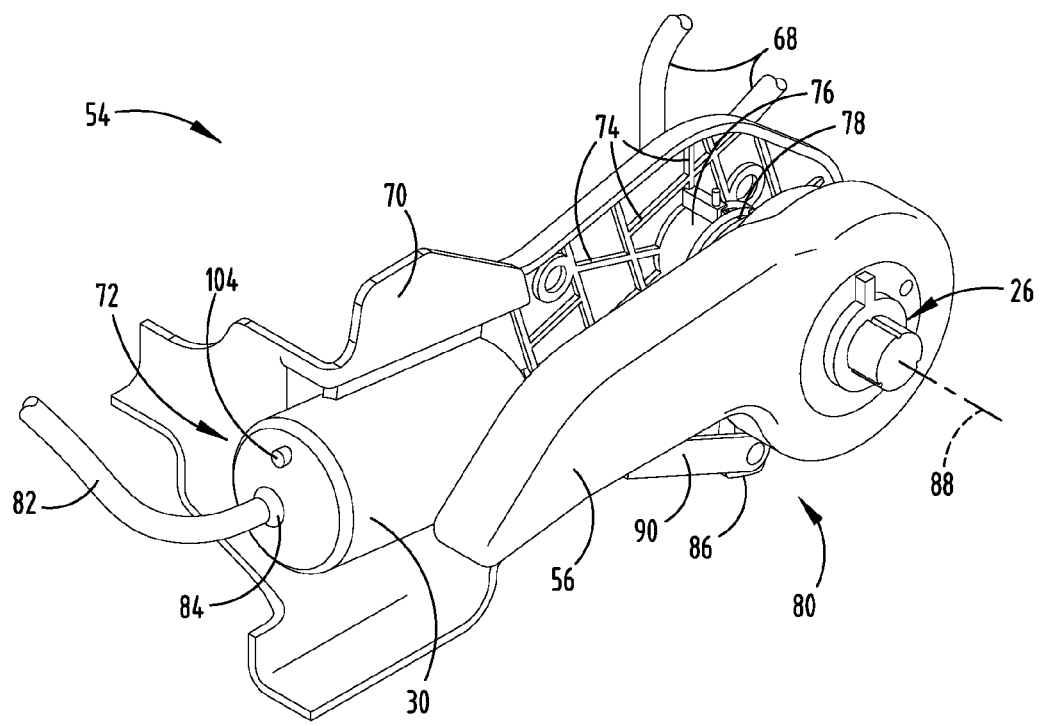
FIG. 4 is a front top perspective view of the air pump apparatus, including an air chamber, a selection device, and a lever, showing an exterior side thereof.
Figure 5:
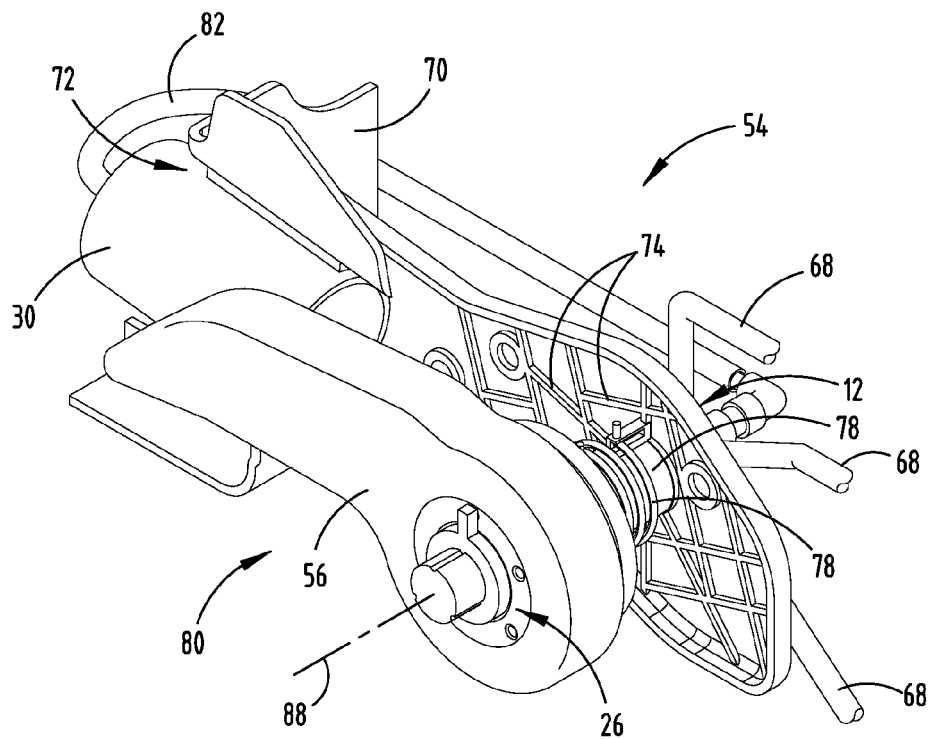
FIG. 5 is a rear top perspective view of the air pump apparatus, showing the exterior side thereof.

As illustrated in FIGS. 4 and 5, the air pump apparatus 54 of the lumbar pump assembly 10 includes a base bracket 70 that is configured to fixedly couple with the seat base 36. The base bracket 70 houses the air chamber 30 and portions of the valve body 20 along with providing a structural interface for rotatably connecting the lever 56. A forward portion of the base bracket 70 includes a recess 72 on an exterior side that receives the air chamber 30 and positions the air chamber 30 generally horizontally on the base bracket 70. The base bracket 70 also fixedly secures the air chamber 30 relative to the base bracket 70 and other portions of the air pump apparatus 54. A rearward portion of the base bracket 70 includes a number of reinforcement ribs 74 that stiffen the base bracket 70 proximate a cylindrical member 76. The cylindrical member 76 extends laterally from the exterior side to engage the lever 56 and surrounds a portion of the valve body 20 and the selection device 26. A first spring 78 surrounds the cylindrical member 76 to provide resistive torque to the lever 56 and thereby bias the lever 56 in a home position 80. The cylindrical member 76 also extends from the interior side of the base bracket 70 to support the valve body 20. A supply line 82 extends from an exhaust port 84 of the air chamber 30 to fluidly couple with the inlet 22 of the valve body 20 proximate the cylindrical member 76 on the interior side of the base bracket 70.

Figure 6:
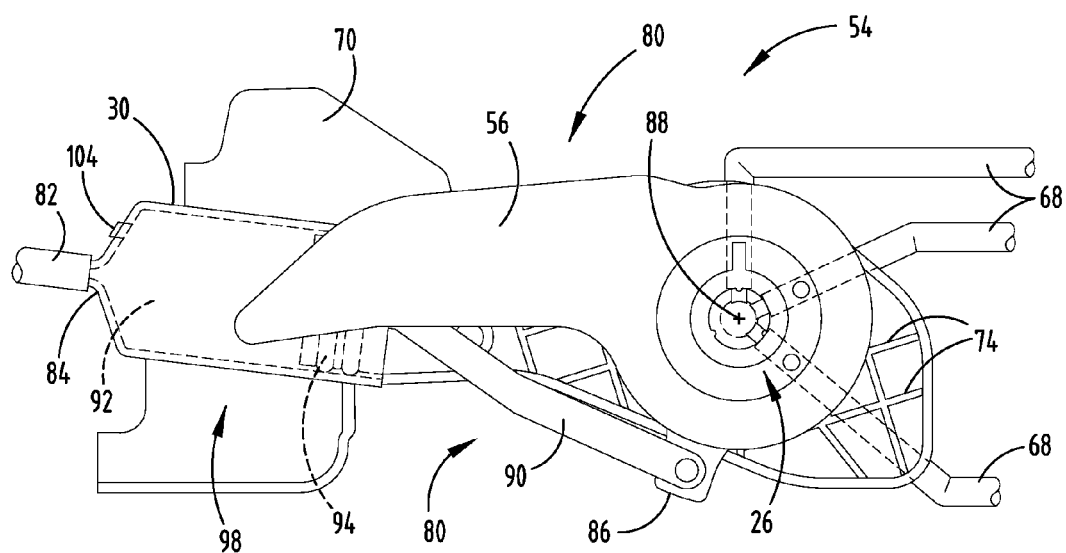
FIG. 6 is a side elevational view of the air pump apparatus taken from the exterior side thereof, showing a cavity of the air chamber and the lever in a home position.
Figure 6A:
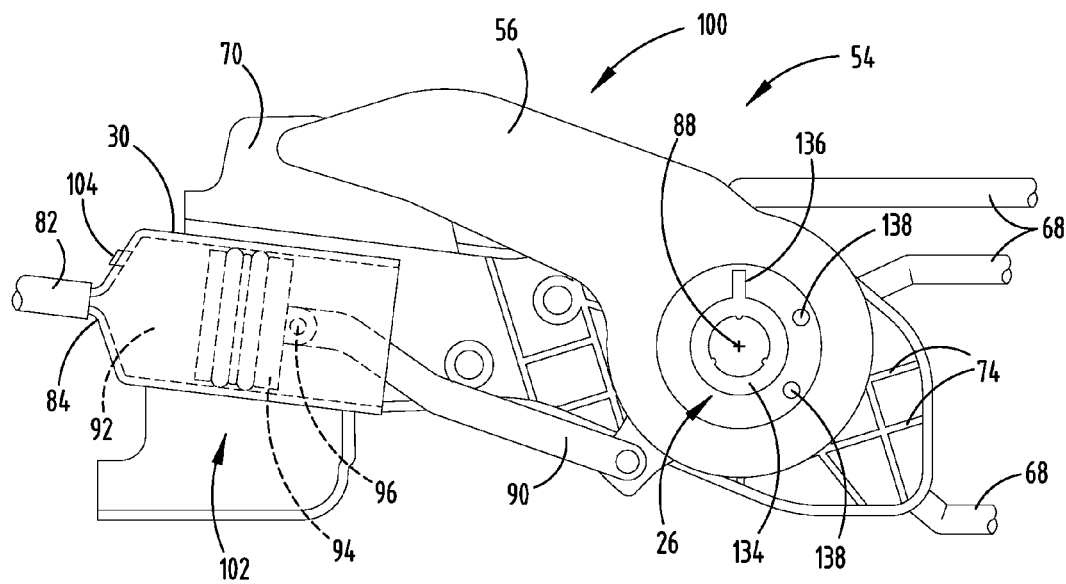
FIG. 6A is a side elevational view of the air pump apparatus, showing movement of the lever to compress air within the air chamber.

In the embodiment shown in FIGS. 6 and 6A, the lever 56 includes a projection 86 that extends radially downward from a pivotal axis 88 of the lever 56. A link 90, which may also be referred to as a piston rod, is pivotally coupled with the projection 86 and extends into a cylindrical cavity 92 of the air chamber 30. A piston head 94 is sealed and slidably coupled within the cylindrical cavity 92 and includes a coupling joint 96 that pivotally attaches with the end of the link 90 opposite the lever 56. Accordingly, with the lever 56 in the home position 80, as illustrated in FIG. 6, the piston head 94 assumes a bottom position 98 within the cylindrical cavity 92. Upon clockwise rotational movement of the lever 56 to a raised position 100, upward about the pivotal axis 88, the projection 86 rotates toward the air chamber 30 moving the link 90 and the piston head 94 upward in the cylindrical cavity 92 to a top position 102. Movement from the bottom position 98 to the top position 102 compresses air in the upper portion of the cylindrical cavity 92 and forces the compressed air to exit the exhaust port 84 of the air chamber 30. Likewise, movement of the piston head 94 from the top position 102 to the bottom position 98 within the cylindrical cavity 92 causes air to be drawn into the upper portion of the cylindrical cavity 92 through an intake port 104 of the air chamber 30. The exhaust and intake ports 84, 104 are one directional air ports, such that air is prevented from being drawn back in through the exhaust port 84 or from being pushed out through the intake port 104, as generally understood by one having ordinary skill in the art. It is contemplated that the intake and exhaust ports 104, 84 may be alternatively located on the air chamber 30 or portions of the supply line 82 or valve body 20 (FIG. 7). It is also conceivable that in additional embodiments counterclockwise rotation of the lever 56 may alternatively move the piston head 94 upward in the cylindrical cavity 92 to the top position 102 to dispense air from the exhaust port 84.

As shown in FIGS. 7 and 8, the valve body 20 on the interior side of the base bracket 70 includes the plurality of outlets 24 extending radially outward from differing radial positions proximate of the cylindrical member 76. In the illustrated embodiment, the valve body 20 is generally cylindrically shaped and houses a shaft portion 106 of the selection device 26. The shaft portion 106 of the selection device 26 has an open end 108 that extends laterally from the valve body 20 to define the inlet 22 of the valve body 20. An elbow joint 110 is attached between the open end 108 of the selection device 26 and the supply line 82 that receives air from the exhaust port 84 (FIG. 6) of the air chamber 30. More specifically, the shaft portion 106 of the selection device 26 is configured to axially extend within a cylindrical interior channel 112 of the valve body 20 to allow rotatable movement of the shaft portion 106 relative to the valve body 20 and further to allow the open end 108 of the shaft portion 106 to protrude from the valve body 20 and engage the elbow joint 110. The plurality of outlets 24 extend radially outward from the valve body 20 and are generally tubular shaped stems with a series of ribbed retention elements 114 to provide frictional and sealed engagement with the air lines 68 that extend to the air bladders 16 (FIG. 3). Accordingly, in the illustrated embodiment, the plurality outlets 24 include three outlets that fluidly couple with the corresponding first, second, and third air bladders 42, 44, 46. The elbow joint 110 also includes a similar air line connection with ribbed retention elements 114 for fluidly coupling with the supply line 82. It is also understood that additional or alternative air line connections, such as hose clamps, may be incorporated on the air line connection with the valve body 20 and the supply line 82 connection with the elbow joint 110.

Figure 9:
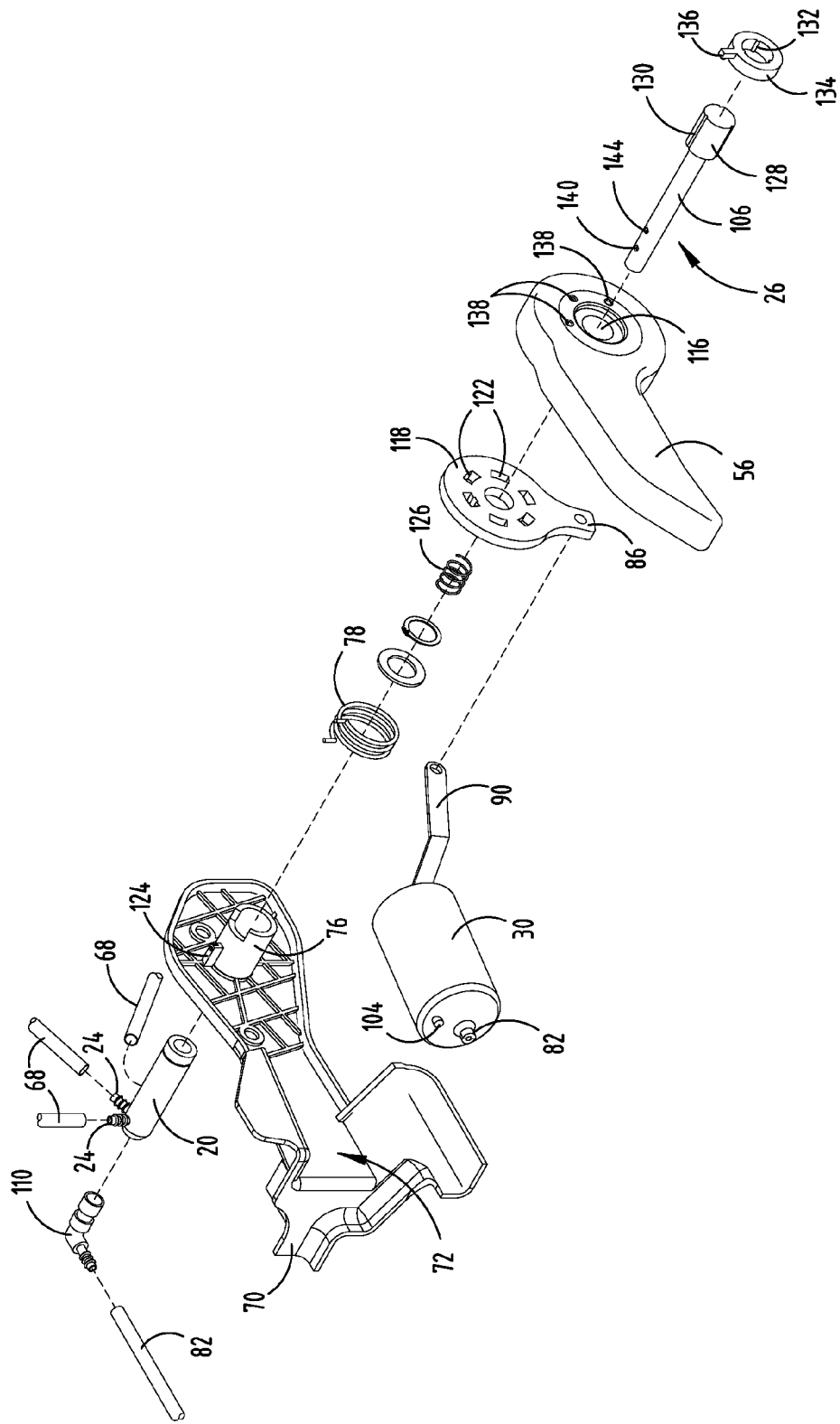
FIG. 9 is an exploded front top perspective view of the air pump apparatus.

As illustrated in FIGS. 8 and 9, the lever 56 includes a rotation aperture 116 that is coaxial with the pivotal axis 88 of the lever 56, allowing the shaft portion 106 of the selection device 26 to be inserted through the lever 56 and into rotational engagement with the valve body 20. On an inside surface of the lever 56, a disk 118 is attached to a series of teeth 120 that surround the rotation aperture 116 on the lever 56. The disk 118 has a series of corresponding slots 122 that engage the teeth 120, such that the disk 118 rotates in conjunction with the rotation of the lever 56. It is understood that the disk 118 may alternatively engage the lever 56 from the teeth 120 engaging the slots 122, such as with adhesive or mechanical fasteners. The disk 118 includes the projection 86 that extends radially downward from the pivotal axis 88 of the lever 56 to engage the link 90 for moving the piston head 94. Upon assembly, the first spring 78 abuts a spring stop 124 that protrudes from the cylindrical member 76 of the base bracket 70. The first spring 78 couples with the disk 118 and coils around the cylindrical member 76 before engaging the spring stop 124 to provide a torsional bias on the lever 56, as explained above. A second spring 126 is coiled around the shaft portion 106 of the selection device 26 and abuts a head portion 128 of the selection device 26 to provide a laterally outward linear bias to the selection device 26. The head portion 128 is positioned within an exterior portion of the rotation aperture 116 in the lever 56, which has a larger diameter than an interior portion of the rotation aperture 116 to prevent the head portion 128 of the selection device 26 from being depressed into the valve body 20, as illustrated in FIGS. 10 and 10A.

As also shown in FIG. 9, the head portion 128 of the selection device 26 also includes linear channels 130 formed on the circumferential surface of the head portion 128 in parallel alignment with the central axis of the selection device 26. The linear channels 130 are formed to receive corresponding notches 132 formed on an interior surface of a ring-shaped selection knob 134. The selection knob 134 has a radial detent 136 that aligns with a select one of three indentations 138 formed around the rotation aperture 116 on the exterior surface of the lever 56. Engagement of the detent 136 with one of the indentations 138 is indicative of engaging the selection device 26 with one of the plurality of outlets 24 for inflating the corresponding air bladder. More specifically, the radial position of the detent 136 is aligned with the radial position of a flow aperture 140 on the shaft portion 106 of the selection device 26 that engages one of the outlets 24 on the valve. It is contemplated that the selection device 26 may be alternatively arranged to have the selection knob 134 and the head portion 128 alternatively integrated or otherwise arranged with other portions of the selection device 26.

Figure 10:
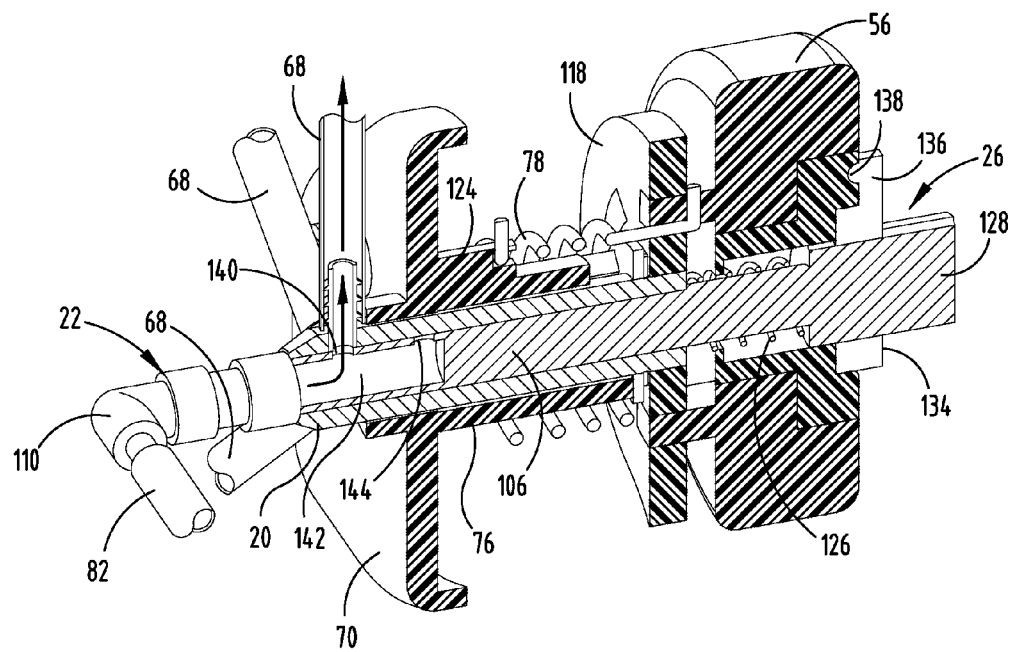
FIG. 10 is a cross-sectional view of the valve body and other portions of the air pump apparatus, taken at line X-X of FIG. 5.

Referring now to FIG. 10, the detent 136 on the selection device 26 is engaged with the uppermost indentation 138, such that the first outlet on the valve body 20 is engaged with the flow aperture 140 on the selection device 26, placing the inlet 22 in fluid engagement with the corresponding first air bladder 42. Accordingly, air that is pumped from the air chamber 30 and through the supply line 82 to the inlet 22 is directed into a hollow cavity 142 of the shaft portion 106 and out the first outlet to the attached air line 68. To prevent airflow from escaping between the selection device 26 and the valve body 20, the exterior diameter of the shaft portion 106 is slightly less but substantially equivalent to the inside diameter of the valve body 20 to provide efficient distribution of air from the air chamber 30 to the corresponding air bladder while allowing for rotation of the shaft portion 106 relative to the valve body 20. Also, the valve body 20 is fixedly coupled within the cylindrical member 76 of the base bracket 70 to prevent rotation between the base bracket 70 and the valve body 20.

Figure 10A:
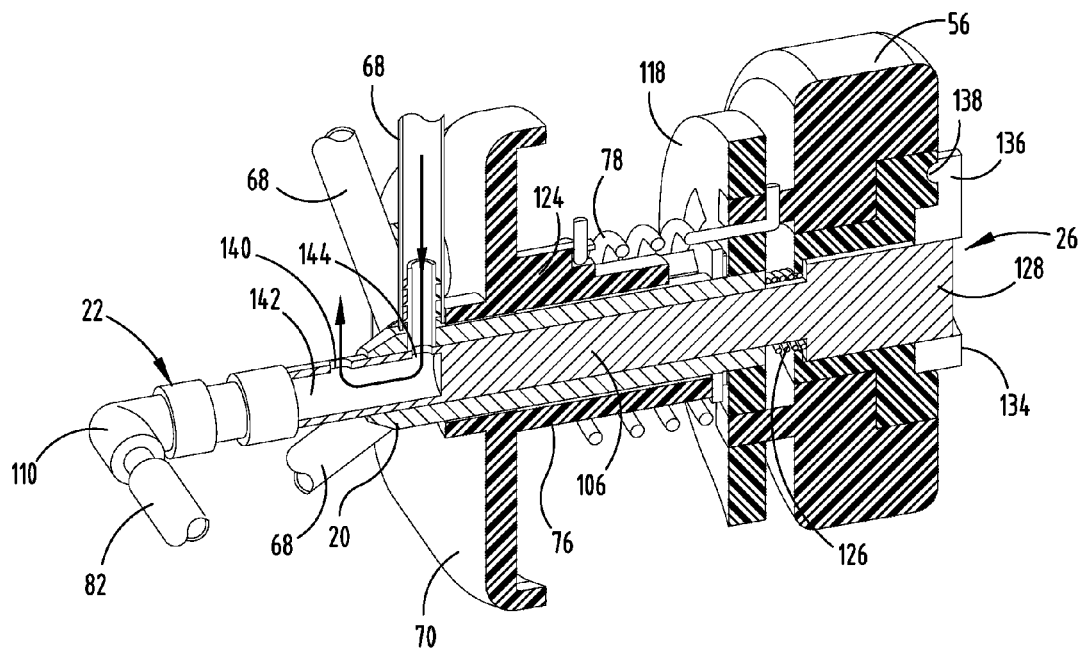
FIG. 10A is a cross-sectional view of the valve body and the other portions of the air pump apparatus taken at line X-X of FIG. 5, showing the selection device depressed to release air from the corresponding air bladder.

The selection device 26, as shown in FIG. 10A, is depressed inward to compress the second spring 126 and to drive the flow aperture 140 outside the valve body 20, positioning an exhaust aperture 144 in alignment with the outlet. The exhaust aperture 144 extends to the hollow cavity 142 of the shaft portion 106 in longitudinal alignment with the flow aperture 140. Upon engaging the exhaust aperture 144 with the outlet, air pressure within the selected air bladder 28 that is greater than surrounding atmospheric air pressure will be exhausted through the exhaust aperture 144 into the interior of the selection device 26 and out through the flow aperture 140 to the surrounding atmospheric air. Deflating the air bladders 16 may also be accomplished by physically compressing the air bladder, such as by exerting a force on the back support surface 48, to create a high enough air pressure within the air bladder to exhaust the air through the exhaust aperture 144. The illustrated embodiment of the lumbar pump assembly 10 is configured such that normal pressure from a seated occupant on the seat back will create enough compression force on the air bladders 16 to substantially deflate the air bladders 16 without providing additional force to the air bladders 16. It is contemplated that the exhaust aperture 144 may also engage additional outlets with separate or additional apertures, such that depressing the selection device 26 will release air from more than one of the plurality of air bladders 16.

Operation of the lumbar pump assembly 10, as illustrated in FIGS. 11A-11D, is further defined by rotating the selection device 26 to engage the detent 136 with the indentation 138 that corresponds with the desired air bladder for inflation or deflation, thereby engaging the supply line 82 with the air line 68 of the desired and selected air bladder 28. Upon selection of the desired air bladder, the lever 56 may be rotated upward to compress the air in the air chamber 30 and thereby move the air through the supply line 82 to the selected air bladder 28. Downward rotation of the lever 56 draws ambient air into the air chamber 30, which can then be again rotated upward to compress and distribute the air to the air bladder 28. Repeated upward and downward rotation of the lever 56 causes the selected air bladder 28 to inflate to the occupant's desired level of firmness and contour of the back support surface 48. Specifically, the back support surface 48 proximate the lumbar region is defined by the exterior surface of the plurality of the air bladders 16, defining the lumbar support 18. As such, inflation of any one of the air bladders 16 increases the back support surface 48 outward proximate that corresponding air bladder.

As shown in FIG. 11B, a first indent 146 is engaged with the selection device 26 and the lever 56 is rotated in an oscillating motion upward and downward to inflate the first air bladder 42, which thereby increases the back support surface 48 forward proximate the first air bladder 42. Similarly illustrated in FIGS. 11C and 11D, a second indent 148 is engaged with the selection device 26 to inflate the second air bladder 44 and a third indent 150 is engaged with the selection device 26 to inflate the third air bladder 46, respectively. Accordingly, the second and third air bladders 44, 46 are sequentially inflated to increase the back support surface 48 in consecutive order in FIGS. 11B-11D. With the plurality of air bladders 16 inflated, the profile of the back support surface 48 has three undulations together forming a generally outwardly curved shape across the peaks of each undulation that is increased the most proximate the second air bladder 44. Accordingly, alternative inflation levels of each air bladder may result in an alternative curved shape to the lumbar support 18. Deflation of the air bladders 16 may also be done by selecting one of the indentations 138 and depressing the selection device 26 to release air from the selected air bladder 28 and reduce the back support surface 48 proximate the selected air bladder 28.

Figure 12:
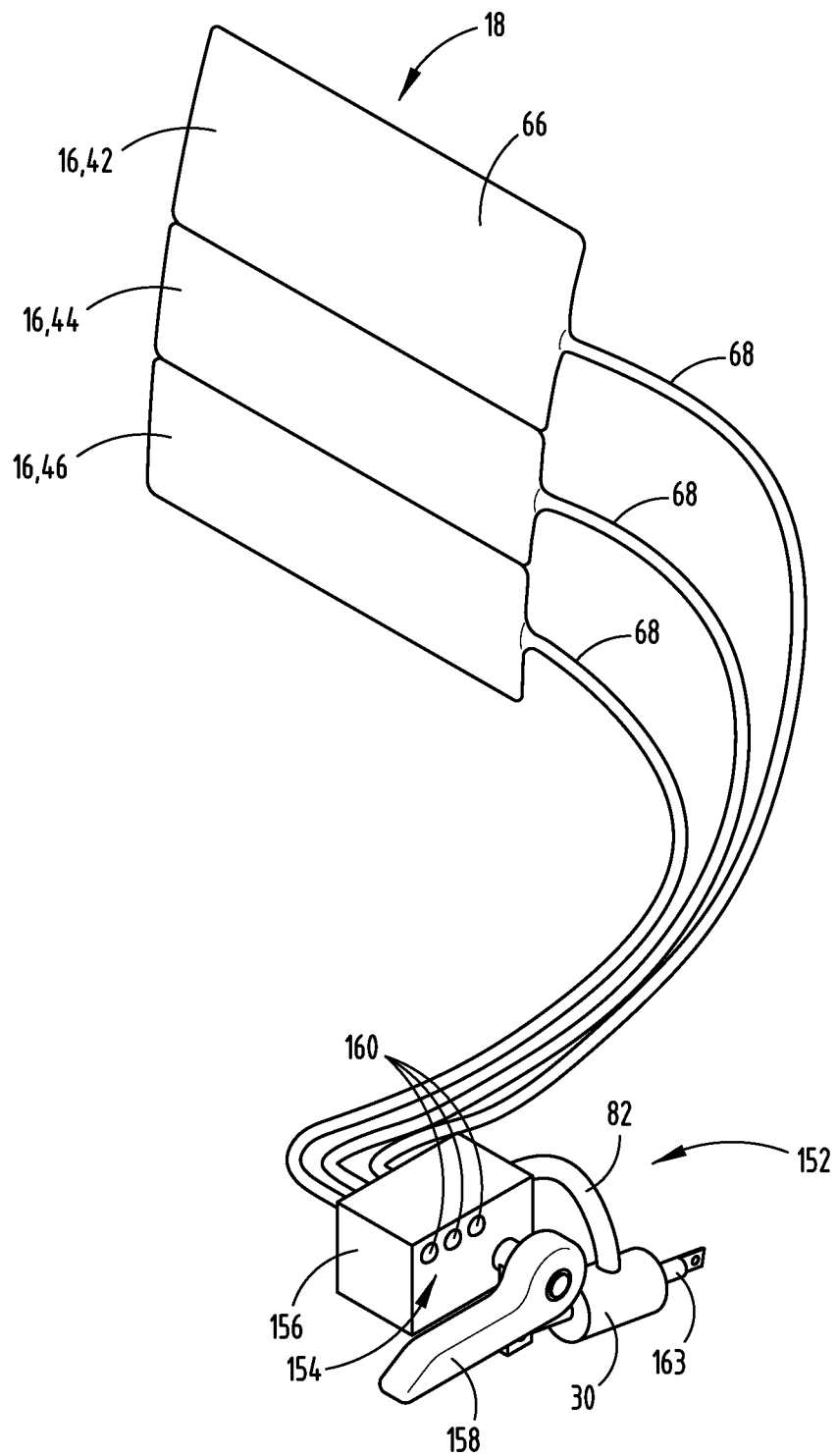
FIG. 12 is a top perspective view of an additional embodiment of the lumbar pump assembly, having a first alternative embodiment of an air pump apparatus.
Figure 13:
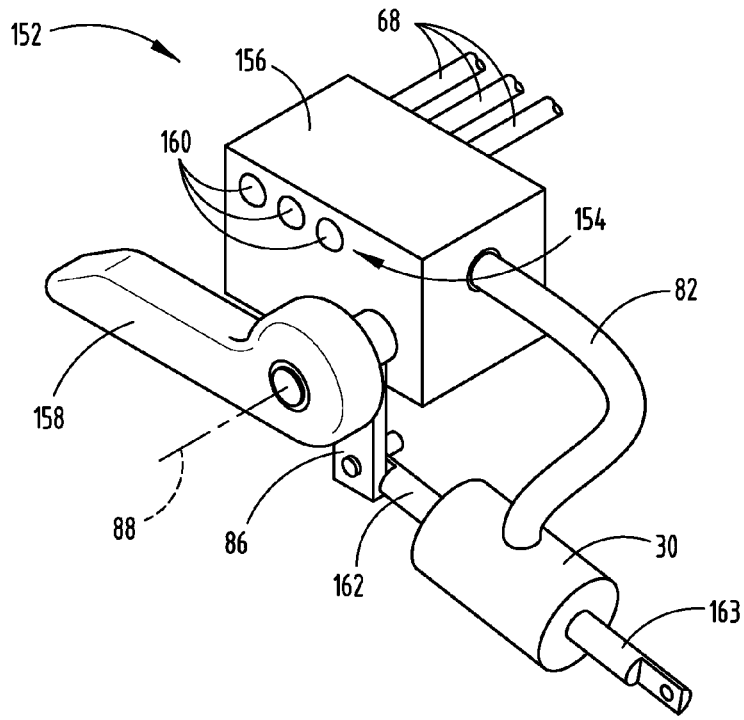
FIG. 13 is a rear top perspective view of the first alternative embodiment of the air pump apparatus, showing an air chamber, a selection device, and a lever thereof.
Figure 14:
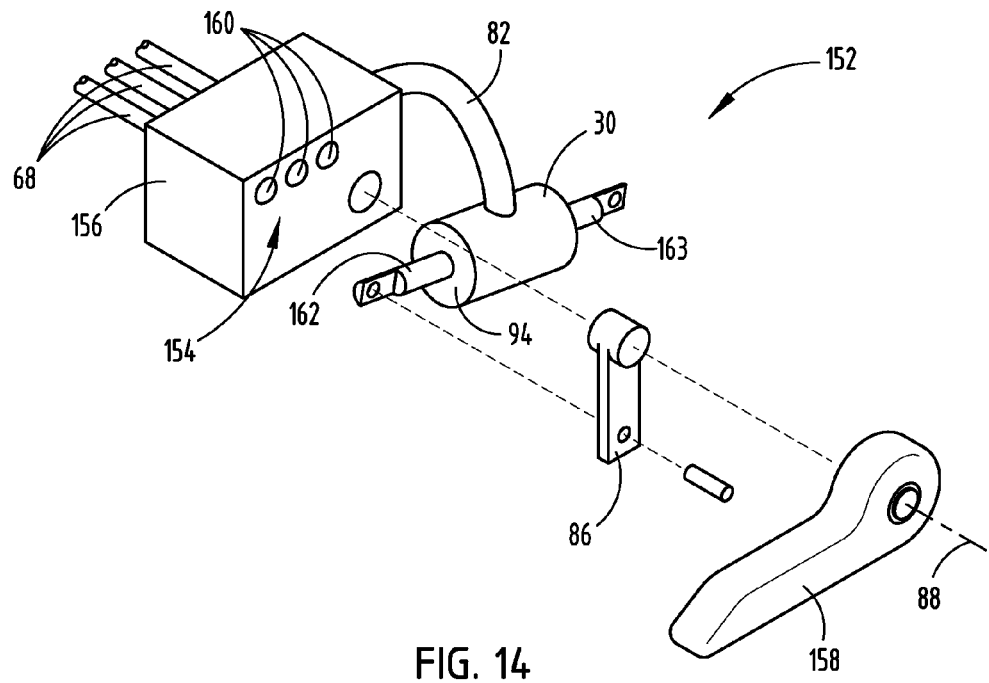
FIG. 14 is an exploded front top perspective view of the first alternative embodiment of the air pump apparatus.
Figure 15:
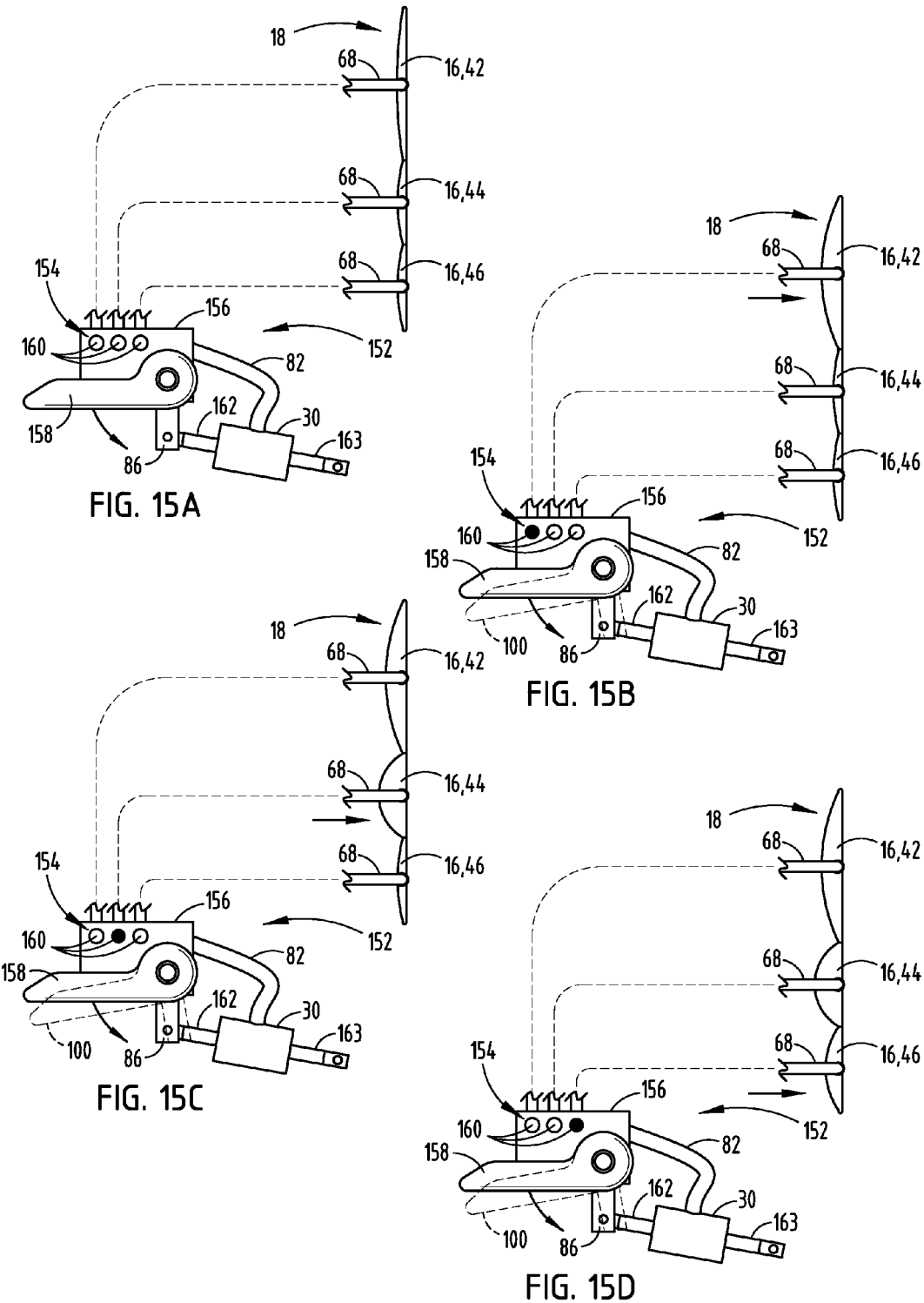
FIG. 15A is a side elevational view of the lumbar pump assembly, schematically showing the first alternative embodiment of the air pump apparatus fluidly coupled with the plurality of air bladders.
FIG. 15B is a side elevational view of the lumbar pump assembly, schematically showing movement of the lever to inflate a first air bladder thereof.
FIG. 15C is a side elevational view of the lumbar pump assembly, schematically showing movement of the lever to inflate a second air bladder thereof.
FIG. 15D is a side elevational view of the lumbar pump assembly, schematically showing movement of the lever to inflate a third air bladder thereof.

Referring now to FIGS. 12-14, a first additional embodiment of the air pump apparatus 152 is shown. In this additional embodiment, a selection device 154 is incorporated with a valve body 156 separate from a lever 158. Specifically, the selection device 154 is comprised of individual buttons 160 for each air bladder 16 that may be depressed to fluidly couple the supply line 82 with the air line 68 for the selected air bladder 28. The lever 158 similarly includes the projection 86 that extends radially downward from the pivotal axis 88 of the lever 158 to pivotally couple with a link 162 that engages the piston head 94 of an air cylinder embodiment of the air chamber 30. The link 162 fixedly couples with the piston head 94, such that a support member 163 extends from an opposing end of the air chamber 30 to pivotally couple with a support bracket or another fixed portion of the vehicle 34 or vehicle seating assembly 14. A flexible supply line 82 extends from the air chamber 30 to the valve body 156 to similarly distribute compressed air for delivery to the selected air bladder 28.

As shown in FIGS. 15A-15D, operation of the first additional embodiment of the air pump apparatus 152 is illustrated, showing oscillating rotation of the lever 158 to inflate the lumbar support 18. The selection device 154 is operated with the three buttons 160 located on the valve body 156. The buttons 160 may be pushbuttons, switches, or other conceivable selection interface as generally understood by one having ordinary skill in the art, to selectively fluidly engage the supply line 82 with one of the plurality of air bladders 16. As shown in FIG. 15B, a first button is selected to engage the airflow from the supply line 82 to the first air bladder 42, which upon rotation of the lever 158 causes airflow to inflate the first air bladder 42. Similarly, the second and third air bladders 44, 46 are inflated by selecting the respective second and third buttons on the selection device 154, as shown in FIGS. 15C and 15D. It is understood that the selection device 154 may include a light indication to notify the user which air bladder has been selected for inflation or deflation. Such an indication may also be provided on a center stack display, instrument cluster display, or other conceivable display to provide a similar notification.

Figure 16:
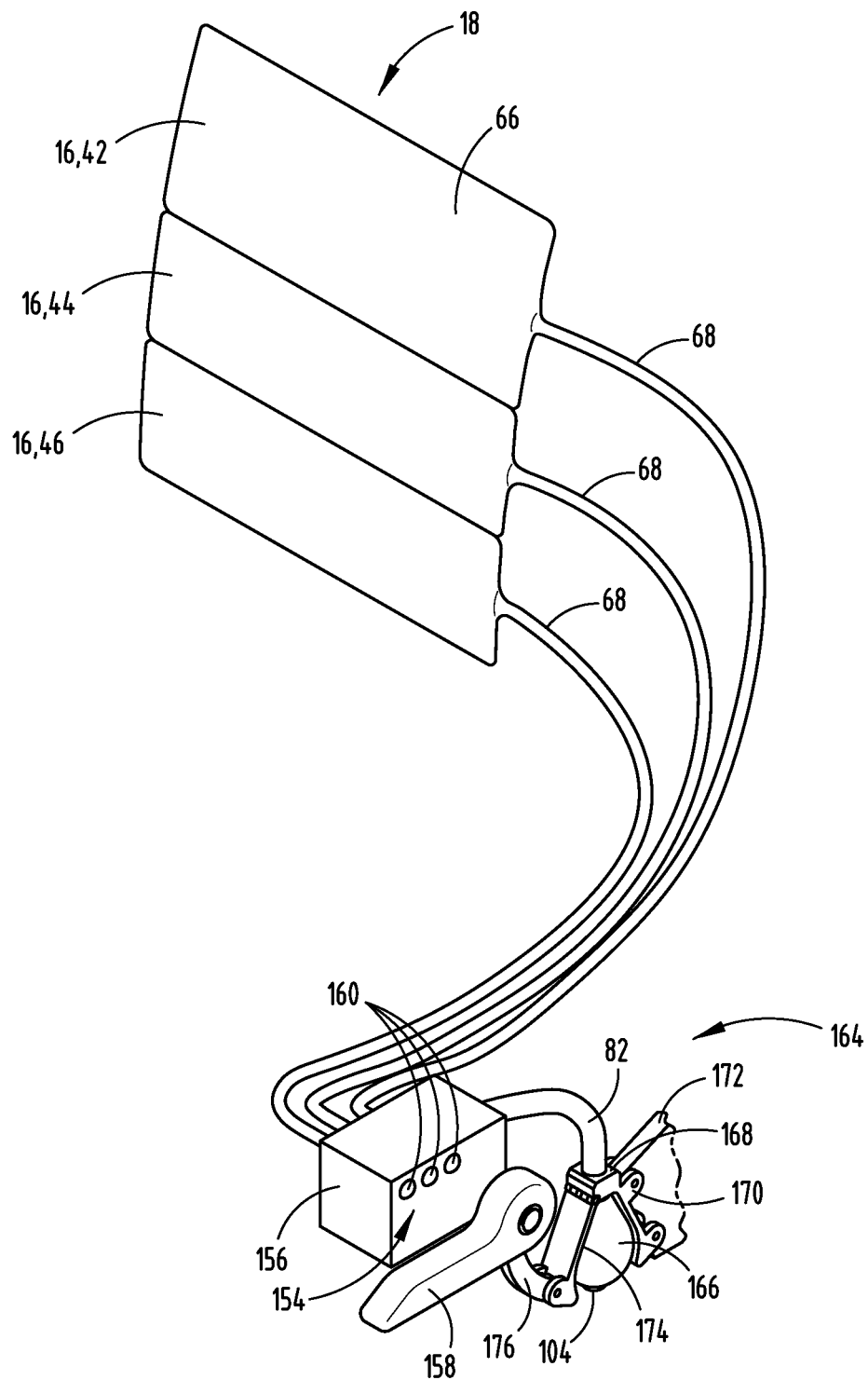
FIG. 16 is a top perspective view of yet another additional embodiment of the lumbar pump assembly, having a second alternative embodiment of an air pump apparatus.
Figure 17:
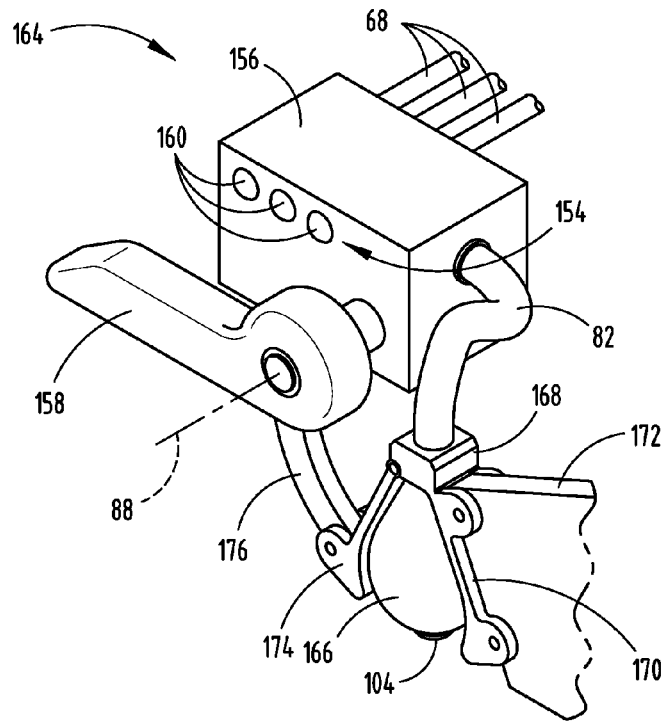
FIG. 17 is a rear top perspective view of the second alternative embodiment of the air pump apparatus showing an air chamber, a selection device, and a lever thereof.
Figure 18:
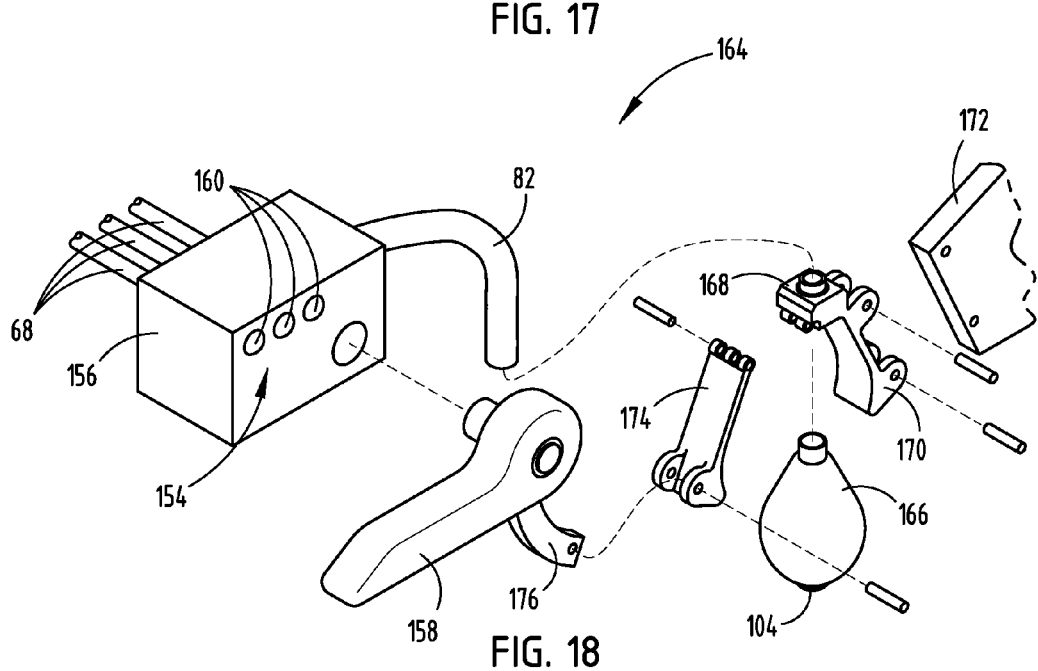
FIG. 18 is an exploded front top perspective view of the second alternative embodiment of the air pump apparatus.

With regard to FIGS. 16-18, yet another embodiment of the lumbar pump assembly 10 is illustrated, including a second additional embodiment of the air pump apparatus 164. One differentiating feature of the second additional embodiment is the replacement of the piston driven air cylinder with an air chamber 30 that comprises a resilient bulb 166 that may be made of an elastomeric material or other material having resilient characteristics. The resilient bulb 166 has a hollow interior that is compressible to distribute air to the supply line 82. A clamping device 168 is positioned around the resilient bulb 166 and is operably coupled with the lever 158, such that rotation of the lever 158 operates to compress the resilient bulb 166. More specifically, the clamping device 168 includes a base member 170 that is fixedly coupled with a floor bracket 172 or another fixed portion of the vehicle 34 or vehicle seating assembly 14. A moveable member 174 is pivotally coupled with the base member 170 proximate the exhaust port 84 of the resilient bulb 166. An opposing end of the moveable member 174 is pivotally coupled with an elongated projection 176 that extends downward from the lever 158. As such, the base member 170 and the movable member 174 are arranged on opposing sides of the resilient bulb 166 to move toward one another in a pivotal arrangement to compress the resilient bulb 166 when the lever 158 is rotated downward.

Figure 19A:
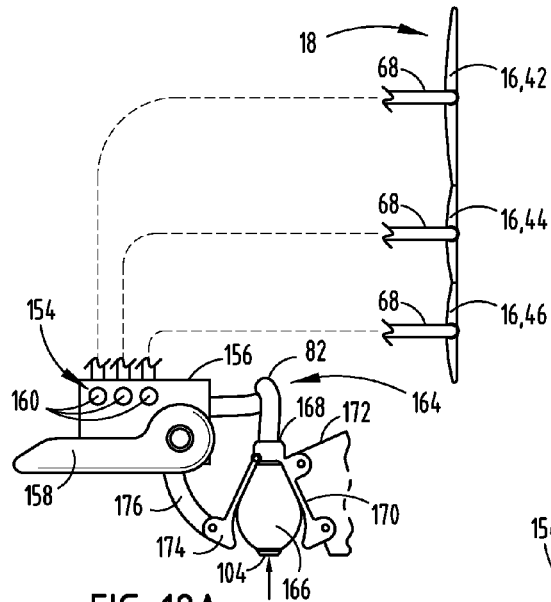
FIG. 19A is a side elevational view of the lumbar pump assembly, schematically showing the second alternative embodiment of the air pump apparatus fluidly coupled with the plurality of air bladders; connection to a first, a second, and a third air bladder thereof.
Figure 19B:
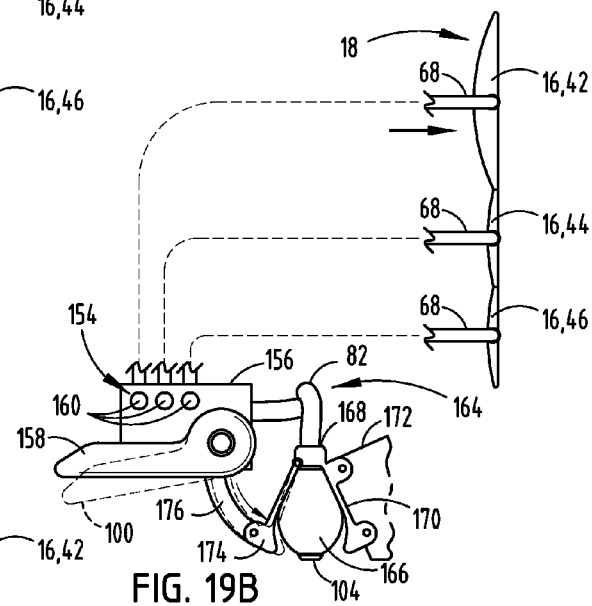
FIG. 19B is a side elevational view of the lumbar pump assembly, schematically showing movement of the lever to inflate a first air bladder.
Figure 19C:
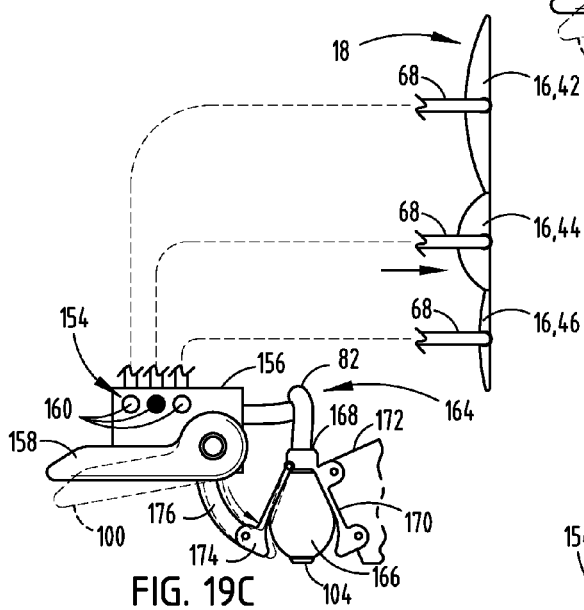
FIG. 19C is a side elevational view of the lumbar pump assembly, schematically showing movement of the lever to inflate a second air bladder.
Figure 19D:
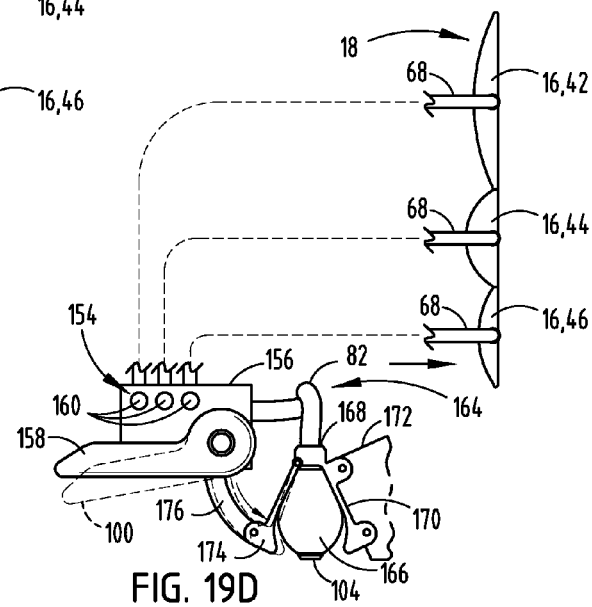
FIG. 19D is a side elevational view of the lumbar pump assembly, schematically showing movement of the lever to inflate a third air bladder.

Operation of the second additional embodiment of the air pump apparatus 164 is shown in FIGS. 19A-19D. Similar to the first additional embodiment, the selection device 154 with buttons 160 attached to the valve body 156 is used to select an air bladder 16 for inflation or deflation. After downward rotation of the lever 158, and compression of the resilient bulb 166, the lever 158 is released to the home position 80, which draws ambient air into the intake port 104 of the resilient bulb 166 as the compressed resilient bulb 166 elastically regains its expanded position. Repeated actuation of the lever 158 in rotational oscillation inflates the selected air bladder 28. Accordingly, as shown in FIG. 19B, the second additional embodiment of the air pump apparatus 164 may be operated when the first button is selected to cause airflow generated by the resilient bulb 166 to inflate the first air bladder 42. Similarly, as shown in FIGS. 15C and 15D, the second and third air bladders 44, 46 are inflated by selecting the respective second and third buttons on the selection device 154, and providing rotational oscillation to the lever 158 for compressing the resilient blub 166. It is also understood that additional embodiments of the air pump apparatus 164 are conceivable to inflate a selected air bladder 28 of the lumbar support 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A pump assembly for a vehicle seatback, comprising:
   a plurality of air bladders defining a lumbar support;
   a valve body having an inlet and a plurality of outlets coupled with the associated plurality of air bladders;
   a selection device including a knob rotatable about an axis and operably coupled with the valve body for engaging the inlet with a select one of the plurality of air bladders;
   a manually compressible air chamber coupled with the inlet for inflating the select one; and
   a lever operably coupled with the manually compressible air chamber and rotatable about the axis to compress an interior cavity of the manually compressible air chamber for dispensing air to the inlet.

2. The pump assembly of claim 1, wherein the manually compressible air chamber includes a pneumatic cylinder that has a sealed head slidably disposed within a cylindrical cavity.

3. The pump assembly of claim 2, wherein:
   the lever is operably coupled with the manually compressible air chamber by coupling with the sealed head for sliding the sealed head into the cylindrical cavity.

4. The pump assembly of claim 1, wherein the selection device includes a shaft that is rotatably coupled with the valve body and is rotatable between a first position and a second position, the knob being fixedly coupled with the shaft, and wherein the first position engages a first one of the plurality of air bladders with the inlet and the second position engages a second one of the plurality of air bladders with the inlet.

5. The pump assembly of claim 1, wherein the selection device includes a shaft having a hollow interior fluidly coupled with the inlet and a flow aperture that rotates to align with a select outlet of the plurality of outlets, the knob being fixedly coupled with the shaft.

6. The pump assembly of claim 5, wherein the shaft is axially depressible and includes an exhaust aperture that aligns with at least one of the plurality of outlets when the shaft is axially depressed to release air from a corresponding one of the plurality of air bladders.

7. The pump assembly of claim 5, wherein the knob has a retention feature that releasably engages the valve body at circumferential positions of the shaft that correspond with the plurality of outlets, thereby resisting rotation of the shaft and holding the flow aperture in alignment with the select one of the plurality of outlets.

8. The pump assembly of claim 1, wherein:
the knob includes a retention feature and a plurality of circumferentially spaced detents with which a portion of the retention feature is releasably engageable; and
the retention feature and the detents are external to the assembly.

9. A lumbar pump assembly comprising:
first and second air bladders defining a lumbar support;
a valve body fluidly coupled with the first and second air bladders;
an air chamber having an exhaust port fluidly coupled with the valve body and configured to manually dispense air therefrom;
a selection device including a knob rotatable about an axis between first and second positions that engage the exhaust port with the respective first and second air bladders; and
a lever operably coupled with the air chamber and rotatable about the axis to manually compress the air chamber for dispensing air to the valve body.

10. The lumbar pump assembly of claim 9, wherein the compressible air chamber includes a pneumatic cylinder that has a piston head slidably disposed within a cylindrical cavity, and wherein the piston head is slidable into the cylindrical cavity to dispense air from the exhaust port and slidable out of the cylindrical cavity to draw ambient air into an intake port of the air chamber.

11. The lumbar pump assembly of claim 9, further comprising:
a seatback having the first and second air bladders disposed laterally across a back support surface of the seatback, wherein manual compression of the air chamber inflates the lumbar support to expand the back support surface forward.

12. The lumbar pump assembly of claim 9, wherein the selection device includes a hollow shaft that is rotatably coupled within the valve body and is rotatable between the first and second positions, the knob being fixedly coupled with the shaft.

13. The lumbar pump assembly of claim 12, wherein the knob has a retention detent that releasably engages the valve body at circumferential positions of the shaft that correspond with the first and second air bladders, thereby resisting rotation of the hollow shaft and holding the selection device in the first or second position.

14. The lumbar pump assembly of claim 9, wherein the valve body includes first and second outlets that couple respectively with the first and second air bladders, and wherein the selection device includes a shaft having a hollow interior fluidly coupled with the exhaust port and a flow aperture extending into the hollow interior that rotatably aligns with a select one of the first and second outlets.

15. The lumbar pump assembly of claim 13, wherein the shaft is axially depressible and includes an exhaust aperture that aligns with at least one of the plurality of outlets when the shaft is axially depressed to release air from a corresponding one of the plurality of air bladders.

16. A lumbar pump assembly comprising:
a seatback having a plurality of air bladders disposed thereon to define a lumbar support;
an air chamber having an intake port for receiving ambient air and an exhaust port for dispensing air upon compression of the air chamber and further having a pneumatic cylinder that has a piston head slidably disposed within a cylindrical cavity;
a lever rotatable about an axis and coupled with the air chamber for manually compressing the air chamber by rotation of the lever, the lever being pivotally coupled with a link that extends into the cylindrical cavity to pivotally couple with the piston head for sliding the piston head within the cylindrical cavity to manually dispense air to the valve body by rotation of the lever;
a valve body having an inlet fluidly coupled with the exhaust port and a plurality of outlets coupled respectively with the plurality of air bladders; and
a selection device including a knob rotatable about the axis and coupled with the valve body for selectively engaging the inlet with a select one of the plurality of outlets for inflating the respective air bladder.

17. The lumbar pump assembly of claim 16, wherein the selection device includes a hollow shaft that is rotatably coupled within the valve body and is rotatable between a first position and a second position, and wherein a hollow interior of the hollow shaft is fluidly coupled with the inlet and a flow aperture extends through a circumferential wall of the hollow shaft and aligns with a select one of the plurality of outlets, the knob being fixedly coupled with the shaft.

18. The lumbar pump assembly of claim 17, wherein the hollow shaft is axially depressible and includes an exhaust aperture that aligns with at least one of the plurality of outlets when the shaft is axially depressed to release air from a corresponding one of the plurality of air bladders.

* * * * *